(12) United States Patent
Kukel

(10) Patent No.: US 9,209,433 B2
(45) Date of Patent: Dec. 8, 2015

(54) RIVETED MODULE

(75) Inventor: Gary Richard Kukel, Easton, PA (US)

(73) Assignee: C&D Technologies, Inc., Blue Bell, PA (US)

( * ) Notice: Subject to any disclaimer, the term of this patent is extended or adjusted under 35 U.S.C. 154(b) by 979 days.

(21) Appl. No.: 13/351,729

(22) Filed: Jan. 17, 2012

(65) Prior Publication Data

US 2012/0183827 A1 Jul. 19, 2012

Related U.S. Application Data

(60) Provisional application No. 61/432,758, filed on Jan. 14, 2011.

(51) Int. Cl.
*H01M 2/02* (2006.01)
*H01M 2/10* (2006.01)

(52) U.S. Cl.
CPC .......... *H01M 2/0245* (2013.01); *H01M 2/1077* (2013.01)

(58) Field of Classification Search
CPC .................... H01M 2/1016; H01M 2/1077
See application file for complete search history.

(56) References Cited

U.S. PATENT DOCUMENTS

| | | | |
|---|---|---|---|
| 2,145,581 A | 1/1939 | Bright | |
| 3,623,917 A | 11/1971 | Chassoux | |
| 4,065,603 A | 12/1977 | Coibion | |
| 4,270,661 A | 6/1981 | Rosenband | |
| 4,883,725 A | 11/1989 | Gerard | |
| 4,994,940 A | 2/1991 | Thouvenin et al. | |
| 5,140,744 A | 8/1992 | Miller | |
| 5,304,434 A * | 4/1994 | Stone | 429/99 |
| 5,366,827 A | 11/1994 | Belanger et al. | |
| 5,403,679 A | 4/1995 | Stone | |
| 5,437,939 A | 8/1995 | Beckley | |
| 5,735,411 A * | 4/1998 | Flamme et al. | 211/26 |
| 5,806,948 A | 9/1998 | Rowan, Sr. et al. | |
| 5,890,606 A | 4/1999 | Kuipers | |
| 5,981,101 A * | 11/1999 | Stone | 429/100 |
| 6,126,022 A | 10/2000 | Merkel | |
| 6,300,003 B1 | 10/2001 | Misra et al. | |
| 6,310,783 B1 | 10/2001 | Winch et al. | |
| 6,451,475 B1 * | 9/2002 | Sherwood | 429/100 |
| 6,475,659 B1 | 11/2002 | Heimer | |
| 6,482,541 B1 * | 11/2002 | Bator et al. | 429/100 |
| 6,641,951 B1 | 11/2003 | Vutetakis et al. | |
| 6,719,150 B2 | 4/2004 | Marraffa | |
| 6,955,055 B2 | 10/2005 | Ebermann | |
| 7,128,219 B2 | 10/2006 | Marraffa | |
| 7,323,271 B2 | 1/2008 | Marraffa | |
| 7,379,305 B2 | 5/2008 | Briggs et al. | |
| 7,548,429 B2 | 6/2009 | Miller | |
| 7,575,828 B2 | 8/2009 | Marraffa | |
| 7,740,142 B2 | 6/2010 | Miller et al. | |

(Continued)

*Primary Examiner* — Ula C Ruddock
*Assistant Examiner* — Archer Dudley
(74) *Attorney, Agent, or Firm* — Hoffmann & Baron, LLP

(57) ABSTRACT

A modular system for mounting batteries that includes one or more modules mounted on a base. Each of the modules includes a top tray and a bottom tray and two side walls. The first end of each tray has a wall extending from the surface and the opposing sides have a section that is inserted into slots in the side walls. The side walls have a flanged edge on all four sides. A plurality of apertures in the top tray, the bottom tray, the tray walls and the flanges of the side walls are aligned and fastening devices are used to secure the trays to the side walls and to attach adjacent modules to form the modular system.

12 Claims, 10 Drawing Sheets

(56) References Cited

U.S. PATENT DOCUMENTS

| | | |
|---|---|---|
| 7,879,485 B2 | 2/2011 | Yoon et al. |
| 2002/0015880 A1 | 2/2002 | Heimer |
| 2002/0179552 A1* | 12/2002 | Marraffa ...................... 211/49.1 |
| 2004/0079714 A1 | 4/2004 | Andrew et al. |
| 2005/0058891 A1* | 3/2005 | Marraffa ........................ 429/99 |
| 2007/0178369 A1 | 8/2007 | Conrardy et al. |
| 2008/0057393 A1* | 3/2008 | Onuki et al. .................. 429/159 |

* cited by examiner

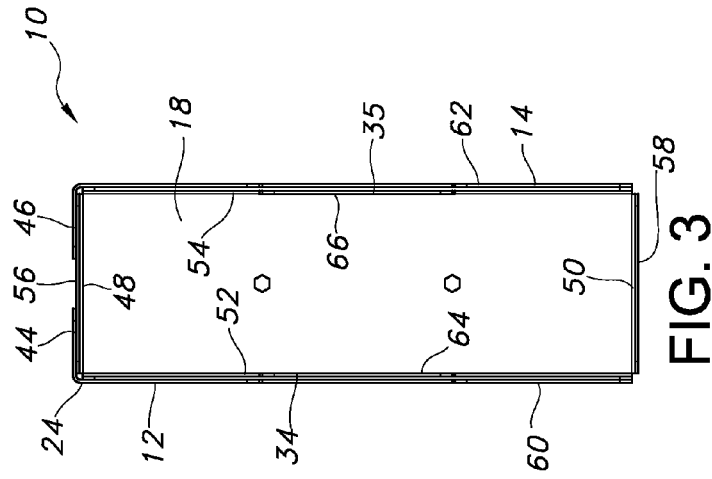
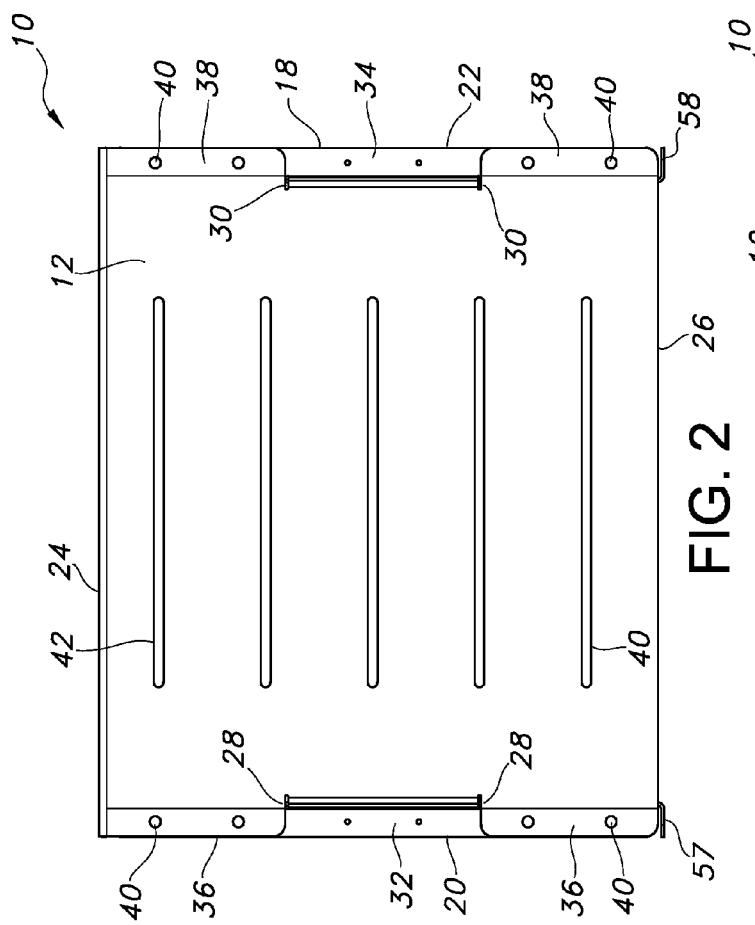
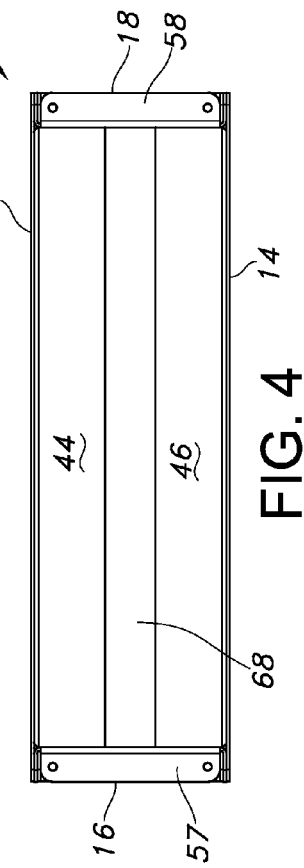

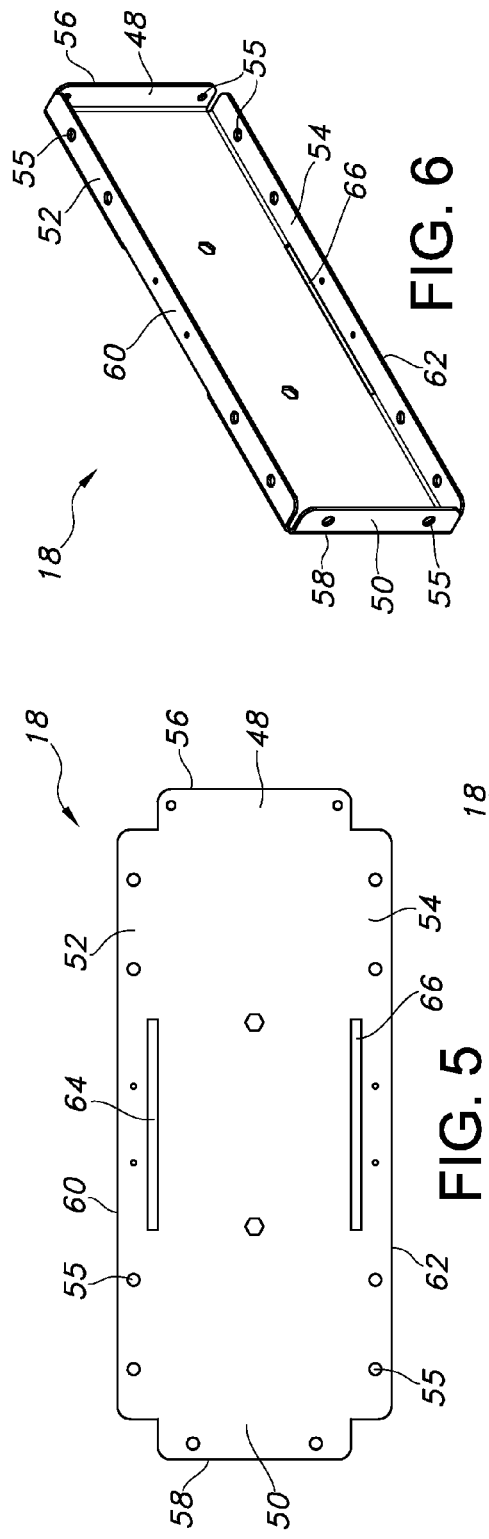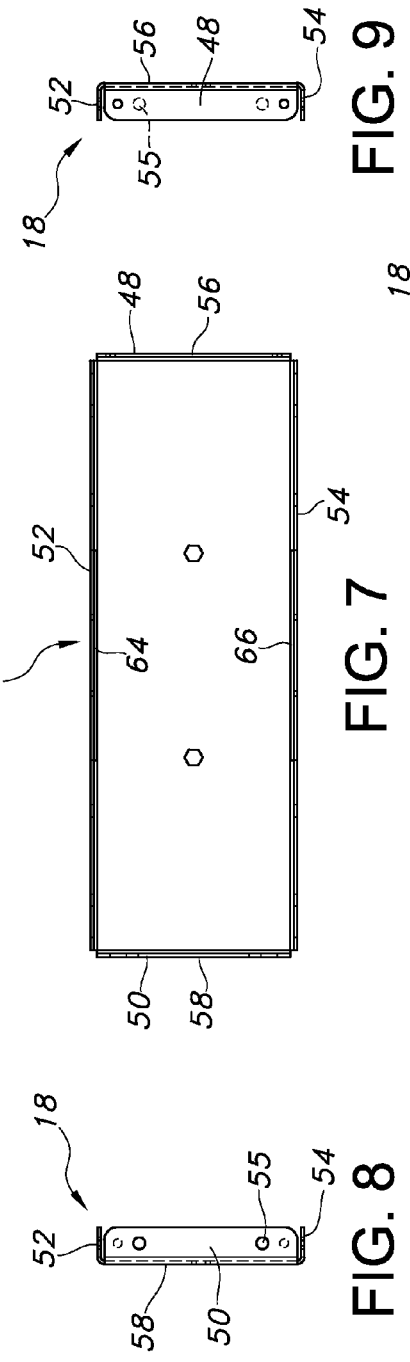

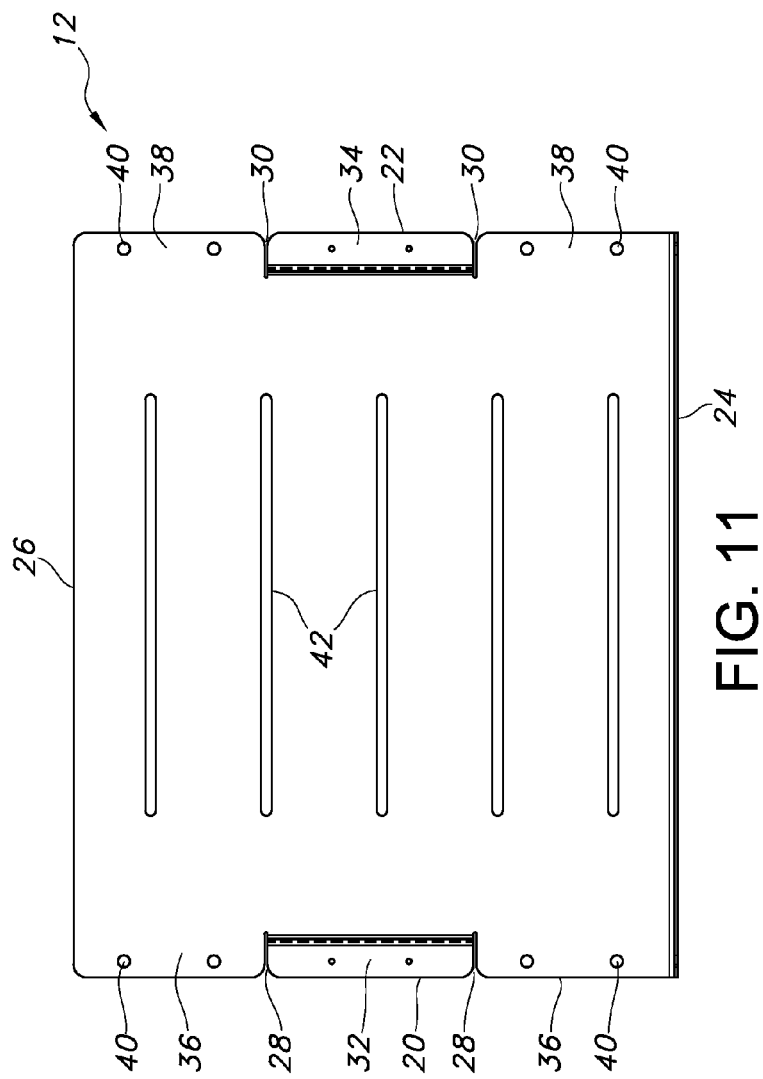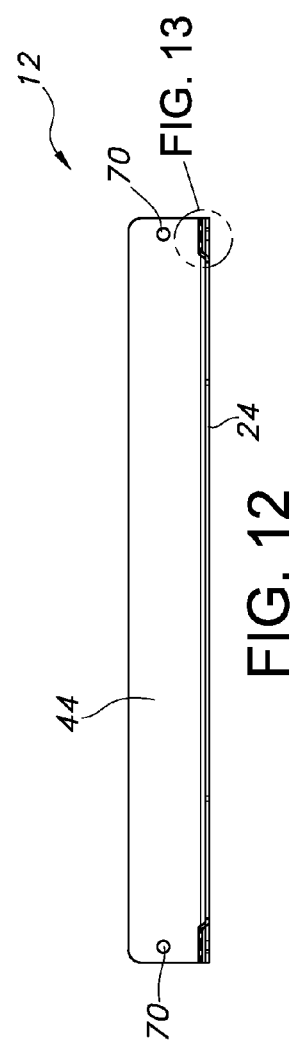

RIVETED MODULE

This application claims priority from provisional application Ser. No. 61/432,758, filed on Jan. 14, 2011, which is incorporated herein in its entirety.

FIELD OF THE INVENTION

The present invention is a system for storing and transporting sealed lead acid batteries. In particular, the present invention relates to a riveted module for storing and transporting sealed lead acid batteries that can be assembled into a modular system.

BACKGROUND OF INVENTION

Various types of electronic equipment require back-up batteries to assure continuous operation in the event of a loss of mains power. In particular, telecommunication systems require back-up batteries in order to provide uninterrupted service. These telecommunication systems typically have substantial power requirements and multiple batteries are used to back-up the systems. These batteries are generally stored in racks or cabinets that can take up a significant amount of space. Therefore, a convenient and economical system for storing and transporting the batteries is needed.

SUMMARY OF THE INVENTION

In accordance with the present invention, a modular system for mounting batteries is provided. The modular system includes one or more modules mounted on a base. Each of the modules includes a top tray and a bottom tray, each having a substantially flat base with first and second surfaces, first and second ends and two sides with side edges. The first end has a wall extending from the first surface and the opposing ends of the wall have one or more apertures. Each of the sides of the top tray and the bottom tray has one or more slits extending inwardly from the side edges to form two or more sections. Preferably, each of the sides of the top tray and the bottom tray of the one or more modules has two slits extending inwardly from the side edges to form three sections. When three sections are formed, the first surface of the middle section of each of the sides is offset from the first surfaces of the other two sections. There are one or more apertures adjacent to the side edges of the top tray and the bottom tray, preferably in one or more of the sections. The top tray and the bottom tray of each of the one or more modules have one or more slots extending parallel to the ends of the trays, wherein the slots allow air to circulate through the module.

Each of the modules also includes first and second side walls, each side wall having first and second surfaces, a pair of sides and a pair of ends. Each of the sides and ends has a flange extending from the first surface and each of the flanges has one or more apertures. In addition, each of the side walls has a pair of slots adjacent to the flange on each side. Preferably, the one or more apertures in the top tray and the bottom tray are aligned with at least one of the one or more apertures in the flanges on the sides of the side walls.

The module is formed by attaching the two side walls to the top and bottom trays so that the first surfaces and the first ends of the trays are disposed opposite each other and the second surfaces of the side walls are disposed opposite each other. The middle sections of the trays are inserted into the slots in the side walls to attach the side walls to the trays. The one or more apertures adjacent to the edges of the top tray or the bottom tray of one of the one or more modules is/are aligned with the one or more apertures adjacent to the edges of the top tray or the bottom tray of an adjacent module. A plurality of fastening devices is inserted in the aligned apertures to attach the top tray and the bottom tray to the first and second side walls and to attach the one or more modules to the adjacent module. At least one aperture in the opposing ends of each wall of the top tray and the bottom tray is aligned with at least one aperture in one of the end flanges of one of the first or second side walls. A fastening device is inserted through the aligned apertures to secure the wall of the top or bottom tray to the first or second side wall. Preferably, the fastening devices are rivets or nuts and bolts. However, apertures may be threaded so that only a bolt is required or other fastening devices well known to those skilled in the art, such as clips and clamps, can also be used. One or more braces can also be used to connect the one or more modules.

The base is substantially flat and is designed to provide support for the one or more modules of the modular system. Preferably, the base is U-shaped and formed by a first member with opposing ends and second and third members extending from the opposing ends. A support extends between the second and third members. One or more of the modules is/are attached to the base to form the modular system, i.e., the bottom most module is attached to the base and one or more additional modules are then stacked upon one another to form a modular system.

BRIEF DESCRIPTION OF THE FIGURES

The preferred embodiments of the battery module system of the present invention, as well as other objects, features and advantages of this invention, will be apparent from the accompanying drawings wherein:

FIG. 2 is a top view of the battery module shown in FIG. 1.

FIG. 3 is a side view of the battery module shown in FIG. 1.

FIG. 4 is a front view of the battery module shown in FIG. 1.

FIG. 5 is a top view of a flat piece of stamped sheet metal that is used to form a side wall in a battery module of the present invention.

FIG. 6 is a perspective view of the side wall of a preferred embodiment of the battery module.

FIG. 7 is a front view of the side wall of the battery module shown in FIG. 6.

FIG. 8 is a left end view of the flanged end of the side wall of the battery module shown in FIG. 6.

FIG. 9 is a right end view of the flanged end of the side wall of the battery module shown in FIG. 6.

FIG. 10 is a top view of the flanged side of the side wall of the battery module shown in FIG. 6.

FIG. 11 is a top view of a top/bottom tray of a preferred embodiment of the battery module.

FIG. 12 is an end view of the tray shown in FIG. 11.

DETAILED DESCRIPTION OF THE INVENTION

Figure 1:
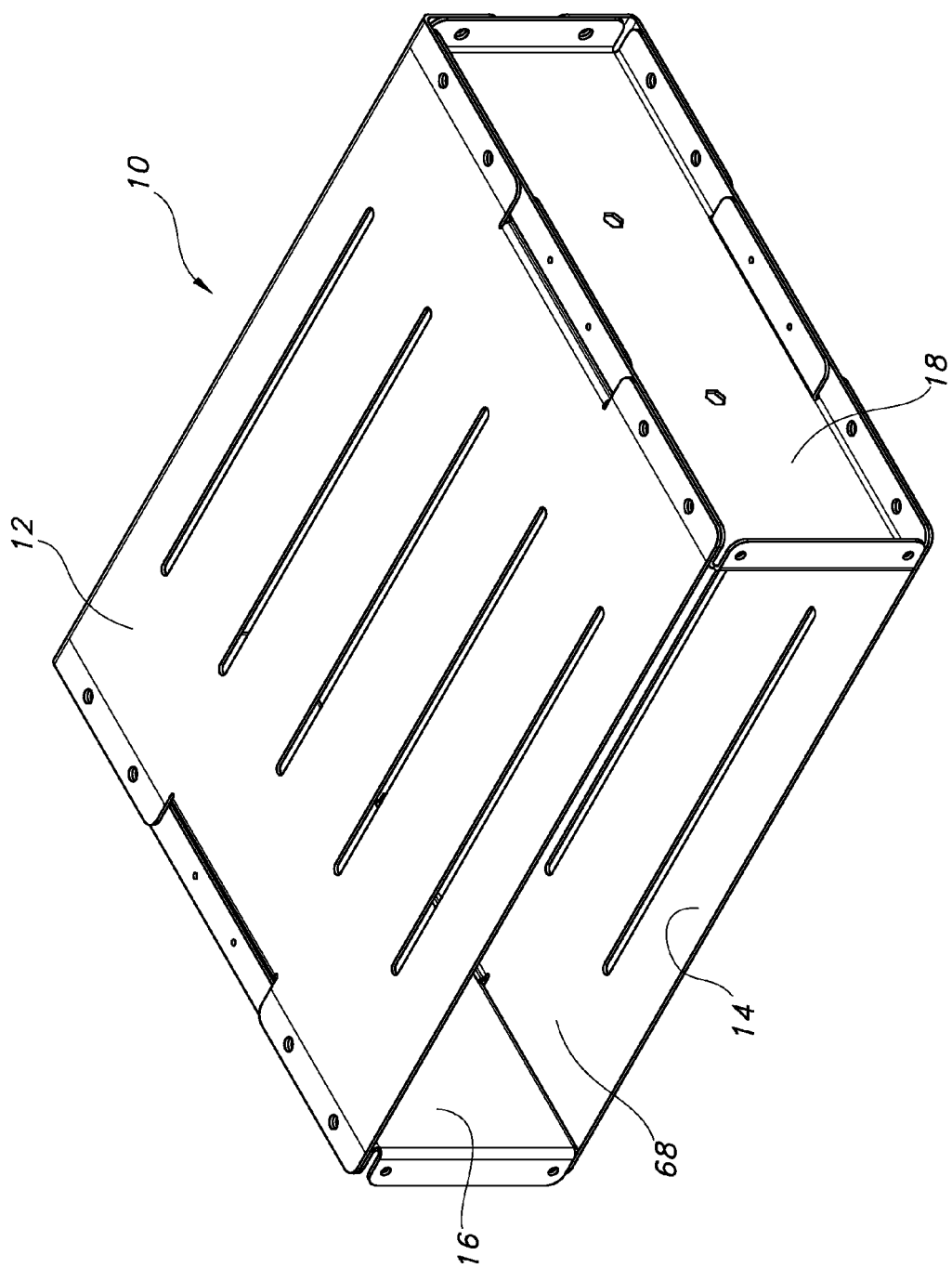
FIG. 1 is a perspective view of a preferred embodiment of a battery module that is used to form the battery module system of the present invention.

The present invention is battery module system and a method for forming such a system for mounting batteries at a user site or facility. The battery module system includes one or more battery modules fabricated from custom formed bent steel components. Each battery module is an enclosure formed by two side walls and top and bottom trays that extend between the side walls and define an interior. The side walls and trays can be initially assembled using rivets and then connected on-site to other modules using standard hardware to form a modular system. The side walls and trays are attached by fasteners, preferably nuts and bolts or screws, and most preferably rivets, for easy assembly. The battery module system is formed by stacking and connecting two or more of the battery modules together. Adjoining modules can be attached by rivets or by using nuts and bolts or other fastening devices. This can be done by the manufacturer or by the user.

Modules for various size batteries can be accommodated with appropriately sized top/bottom trays and side walls (also referred to herein as panels). Special tooling and skilled personnel are not needed to fabricate the components of the battery module system because it does not have to be welded. The battery module system can be shipped as an assembled unit or it can be shipped unassembled and the components can be easily assembled by the user. The battery module systems are designed to securely contain sealed lead acid telecom batteries for up to 10 years or more. The modules are designed to comply with seismic ratings and to be lightweight and easy to manufacture.

Referring now to the drawings, FIGS. 1-4 show a preferred embodiment of a battery module 10 having a top tray 12, a bottom tray 14, a first side wall 16 and a second side wall 18. FIG. 2 shows a top view of the battery module 10 with first and second sides 20, 22, respectively, and first and second ends 24, 26, respectively. The two sides 20, 22 have a pair of slots 28, 30 extending inwardly from the edges to form three sections, a middle section 32, 34 (hidden by the side walls 16, 18—see FIG. 14) and a pair of outer sections 36, 38. A plurality of apertures 40 in the three sections 32, 34, 36, 38 are used to attach the top tray 12 to the side walls 16, 18. The top tray 12 also has a plurality of slots 42 extending parallel to the ends 24, 26 that allow air to circulate. In preferred embodiments, the top tray 12 and the bottom tray 14 are identical. The side wall 16 has a slots 64 (see FIGS. 6 and 7) for receiving the middle section 34 of the top tray 12.

FIG. 3 shows a side view of the battery module 10 with side wall 18 secured to the top and bottom trays 12, 14. Each tray 12, 14 has a wall 44, 46 extending from the first end 24. The side wall 18 has flanges 48, 50 and 52, 54 extending from the two opposing ends 56, 58 and the two opposing sides 60, 62, respectively. Two slots 64, 66 are located on the opposing sides 60, 62 of the side wall 18 next to the flanges 52, 54. The middle sections 34, 35 of the top and bottom trays 12, 14 extend through the slots 64, 66, respectively, to secure the trays 12, 14 to the side wall 18.

FIG. 4 is a front view of the battery module 10 and shows the end flanges 57, 58 of the side walls 16, 18 on either side of an opening 68. The walls 44, 46 extending from the first ends 24, 25 of the top and bottom trays, 12, 14 are shown on the opposite end of the module 10.

FIGS. 5-10 show one of the side walls 18 of the module 10. FIG. 5 shows a piece of stamped sheet metal that is used to form the side wall 18. The ends 56, 58 and sides 60, 62 are folded to form the flanges 48, 50, 52, 54 of the side wall 18. FIGS. 6 and 7 show the side wall 18 after the flanges 48, 50, 52, 54 are formed with a plurality of apertures 55 therein. FIGS. 8 and 9 show the opposing ends 56, 58 of the side wall 18 with the end flanges 48, 50, respectively, and the opposing side flanges 52, 54. FIG. 10 shows the side flange 52 on one of the sides 60 of the side wall 18 and the two opposing end flanges 48, 50.

Figure 13:
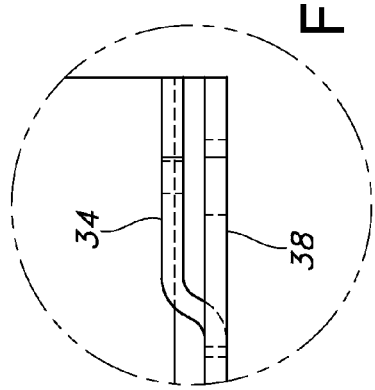
FIG. 13 is a detail of the corner of the tray shown in FIG. 12.

FIG. 11 shows a top view of the top tray 12 having two opposing sides 20, 22 and two opposing ends 24, 26. Each of the opposing sides 20, 22 is divided into three sections, a middle section 32, 34 and a pair of outer sections 36, 38 by a pair of slots 28, 30 extending inwardly from the edge of each side 20, 22. The center section 32, 34 on each side 20, 22 is offset from the outer sections 36, 38 in the same direction as the wall 44 on one end 24 of the tray 12. The center sections 32, 34 on the opposing sides 20, 22 are received by the slots 64, 66 in the side walls 16, 18 (see FIGS. 5-7). FIG. 12 shows one end 24 of the tray 12 with a wall 44 extending upwardly. The wall 44 has apertures 70 on the opposing ends, which can be used to attach the module 10 to the side walls 16, 18. FIG. 13 is a detail end view of the tray 18 shown in FIG. 12 and illustrates how the center section 34 is offset from the outer sections 38 of the tray 12.

Figure 14:
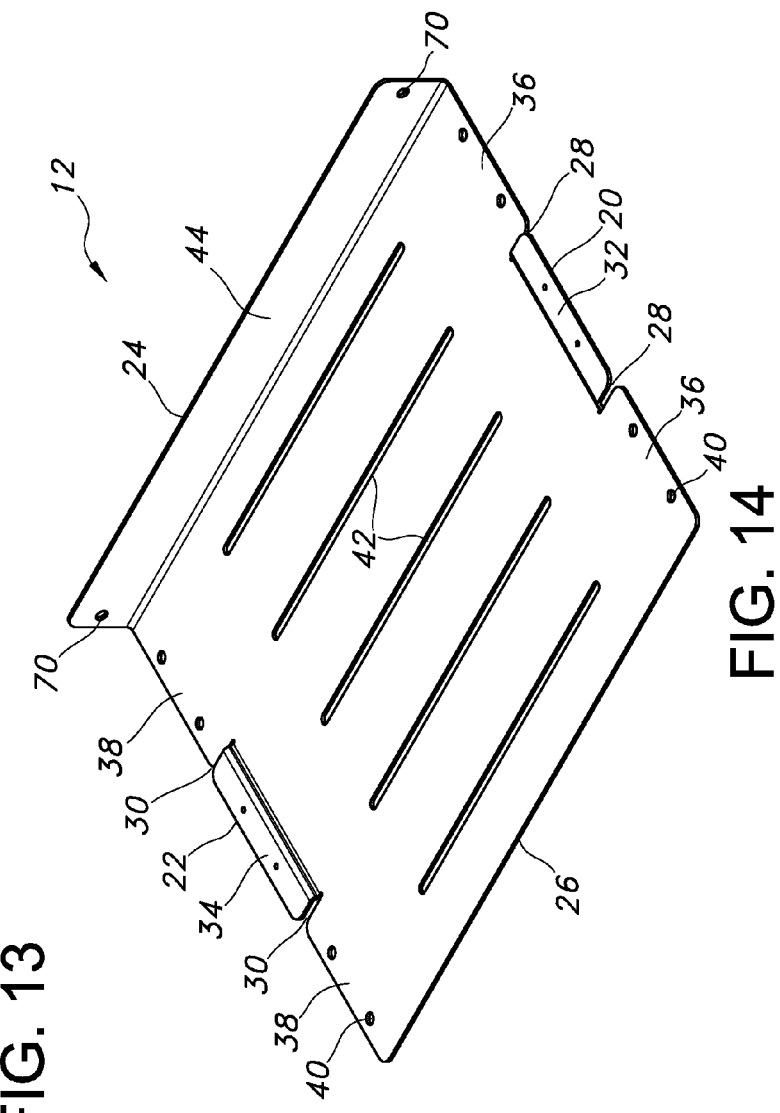
FIG. 14 is a perspective view of the tray shown in FIG. 11.

FIG. 14 shows the tray 12 with the end wall 44 extending upwardly on one end 24. The offset center sections 32, 34 on the sides 20, 22 extend upwardly in the same direction as the end wall 44. The slots 42 in the tray 12 extend parallel to the end wall 44. A plurality of apertures 40 is located along the sides 20, 22 of the tray 12 and a pair of apertures 70 is located at opposing ends of the wall 44. The apertures 40 located along the sides 20, 22 of the tray 12 align with the apertures 55 in the flanges 48, 50, 52, 54 on the side walls 16, 18 when the module 10 is assembled and fastening devices, such as rivets (not shown), are used to attach the side walls 16, 18 to the trays 12, 14 (see FIG. 1).

Figure 16:
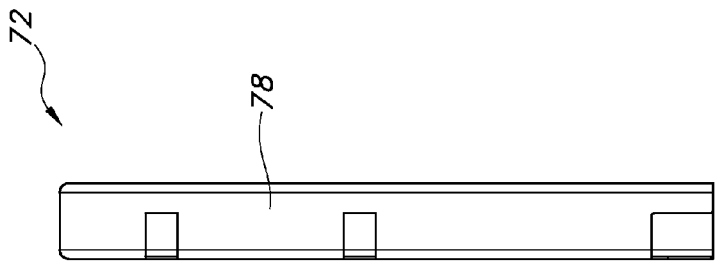
FIG. 16 is a side view of the base shown in FIG. 15.
Figure 15:
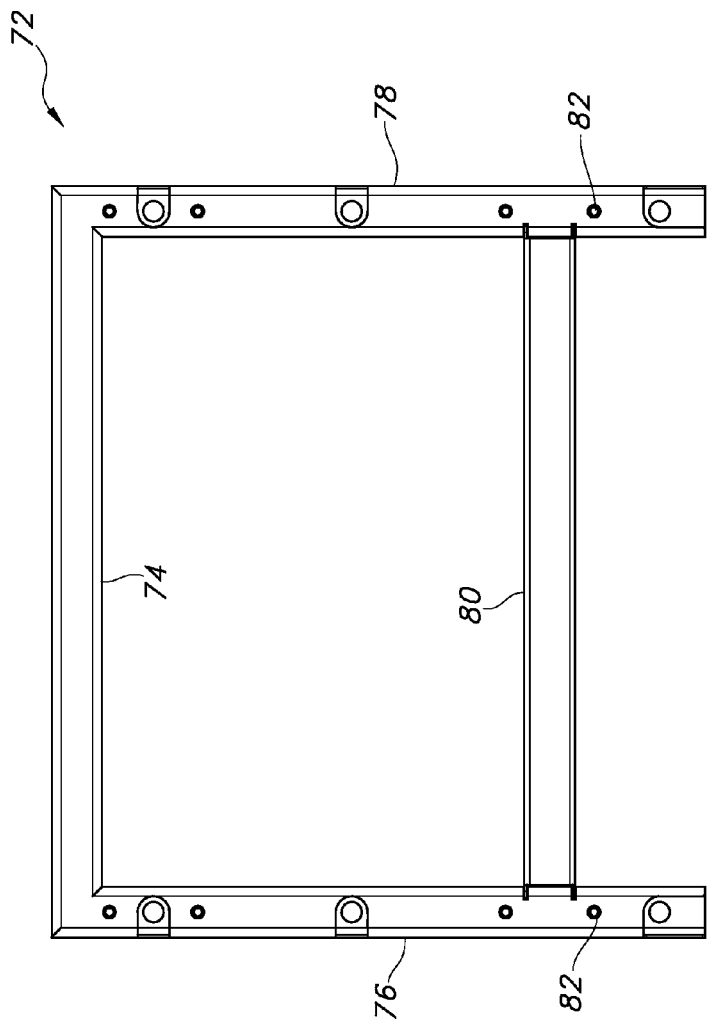
FIG. 15 is a top view of the base of a preferred embodiment of the battery module system.
Figure 17:
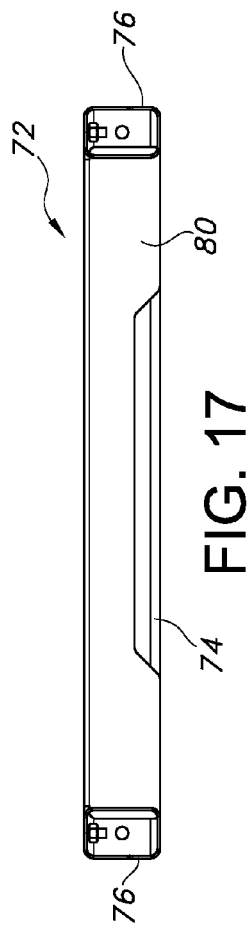
FIG. 17 is a front view of the base shown in FIG. 15.
Figure 18:
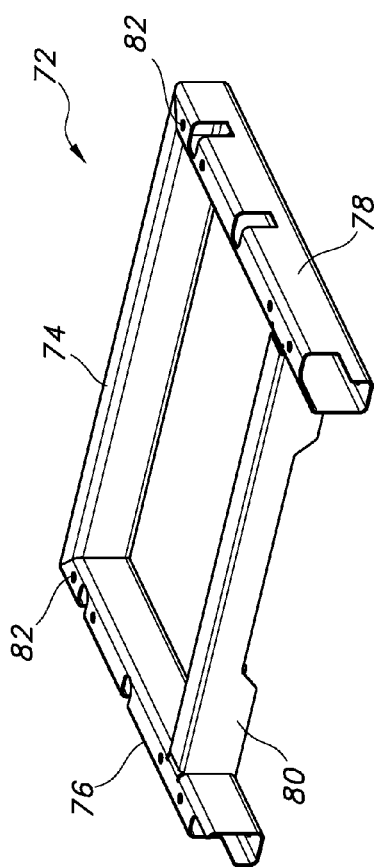
FIG. 18 is a perspective view the base of a preferred embodiment of the battery module system.
Figure 20:
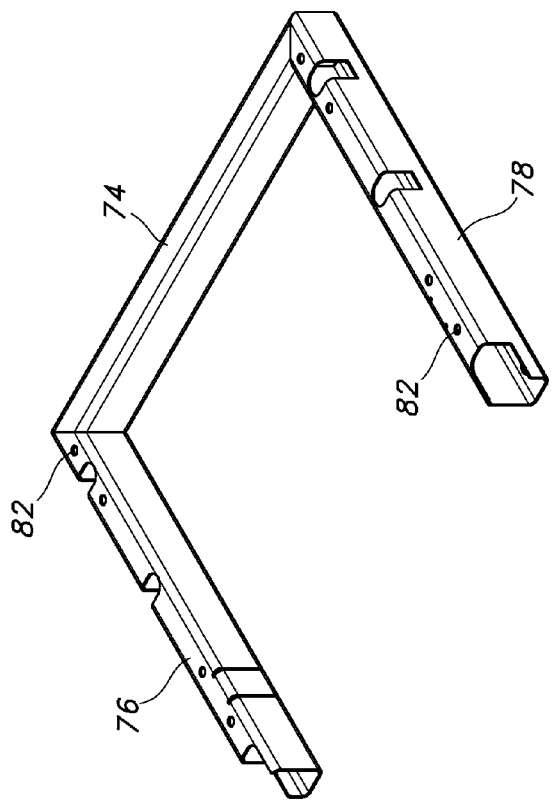
FIG. 20 is a perspective view the support of the base shown in FIG. 18.
Figure 19:
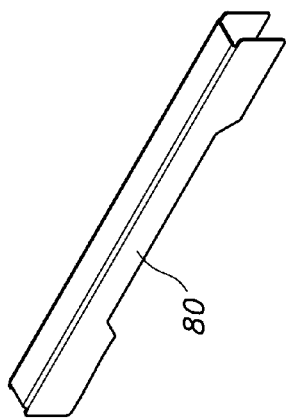
FIG. 19 is a perspective view the U-shaped portion of the base shown in FIG. 18.
Figure 21:
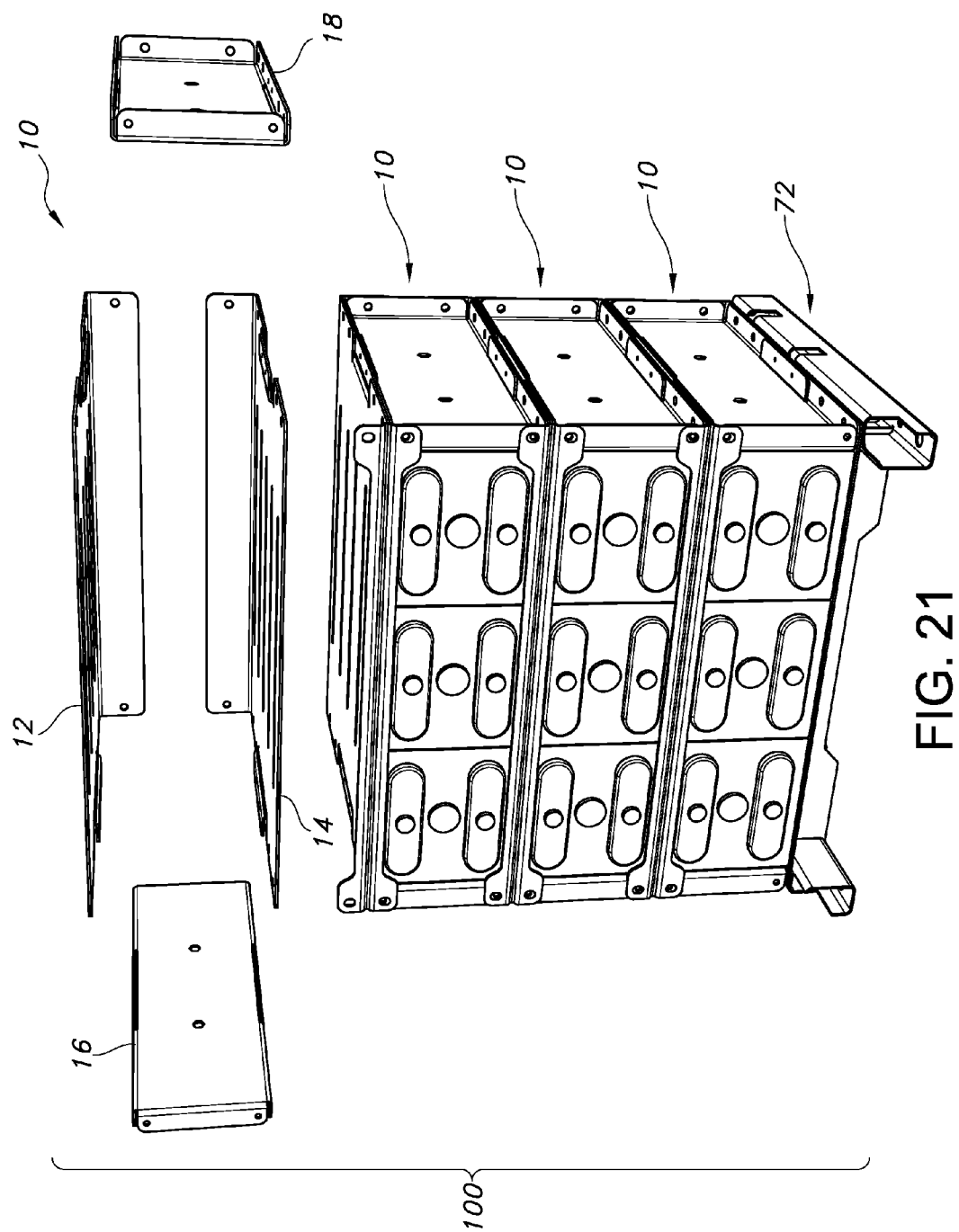
FIG. 21 is shows a preferred embodiment of the battery module system of the present invention with an exploded view of the top module.
Figure 22:
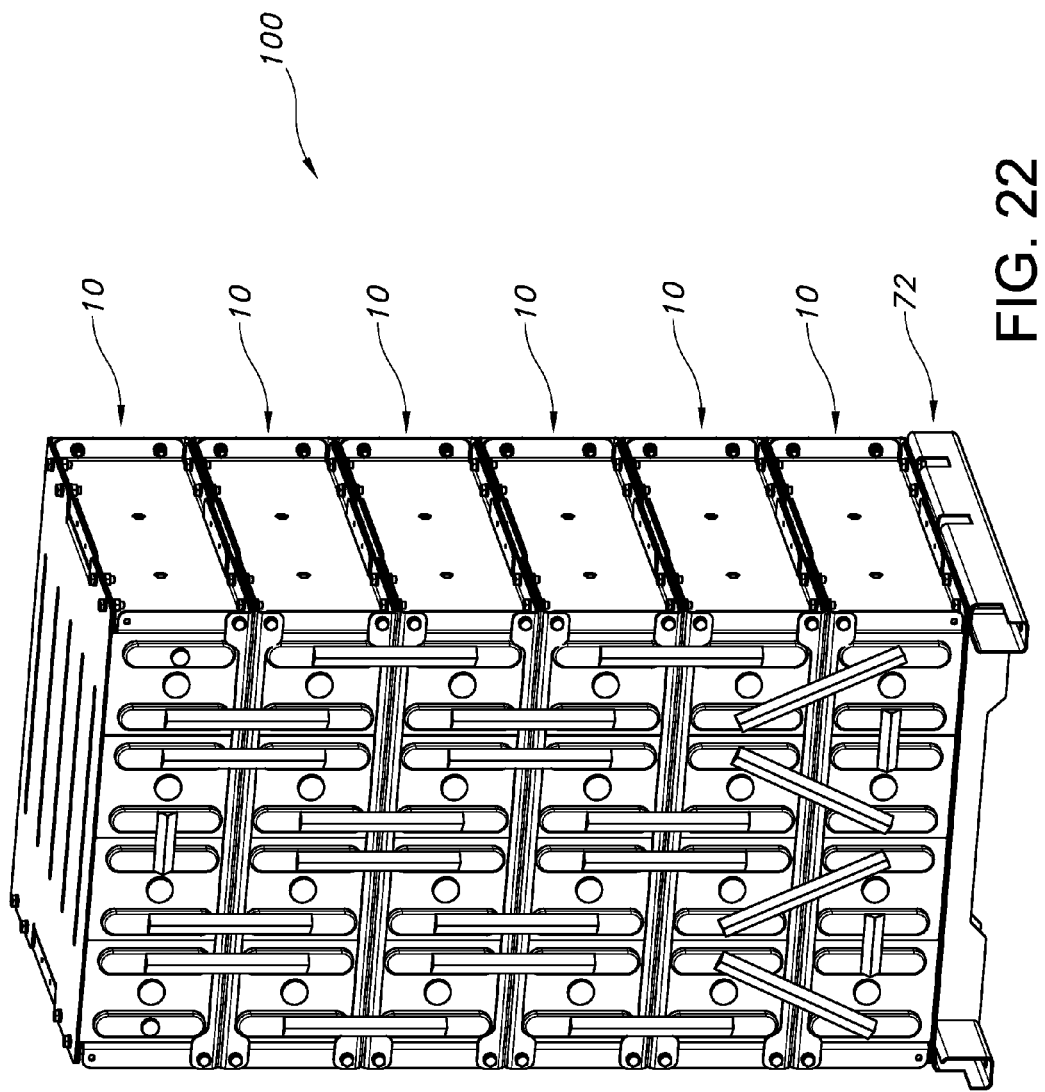
FIG. 22 shows a preferred embodiment of an assembled battery module system of the present invention.

FIG. 15 shows the base 72 of the battery module system 100 (see FIGS. 21 and 22). The base 72 is U-shaped and is formed by a first member 74 with opposing ends and second and third members 76, 78 extending from the opposing ends with a support 80 extending between the second and third members 76, 78. The base 72 has a plurality of apertures 82 that are used to attach one or more modules 10 to the base 72. FIG. 16 shows a side view and FIG. 17 shows a front view of the base 72. FIGS. 18-20 show the assembled base 72 (FIG. 18) and the support 80 (FIG. 19) and the members 74, 76, 78 (FIG. 20) separately.

Figure 23:
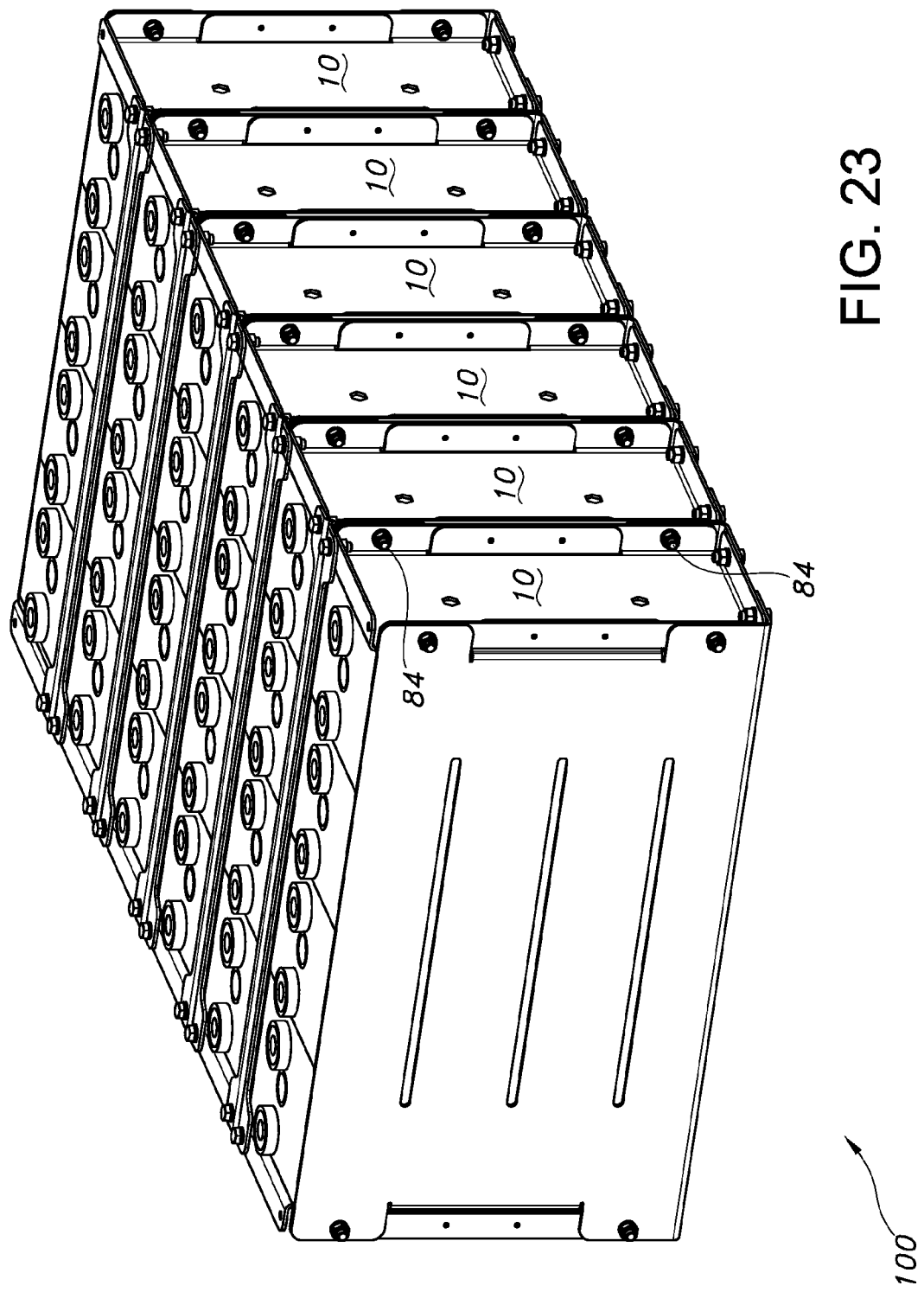
FIG. 23 is a perspective view of a preferred embodiment of an assembled battery module system of the present invention.

FIG. 21 shows a preferred embodiment of the battery module system 100 with an exploded view of the top module 10 and three other modules 10 attached to a base 72. FIG. 22 shows an assembled battery module system 100 with six modules 10 mounted on a base 72. FIG. 23 shows an assembled battery module system 100 with six modules 10 attached together with bolts 84.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. A modular system for mounting batteries comprising: one or more modules, wherein each module comprises:
    a top tray and a bottom tray, each having a substantially flat base with first and second surfaces, first and second ends and two sides with side edges, wherein the first end has a wall with opposing ends extending from the first surface, and wherein each of the sides has one or more slits extending inwardly from the side edges to form two or more sections; and
    first and second side walls, each side wall having first and second surfaces, a pair of sides and a pair of ends, wherein each of the sides and ends has a flange extending from the first surface and each of the flanges has one or more apertures, and wherein each of the side walls has a pair of slots adjacent to the flange on each side;
    wherein the module is formed by attaching the two side walls to the top and bottom trays, wherein the first surfaces and the first ends of the trays are disposed opposite each other and the second surfaces of the side walls are disposed opposite each other, and wherein one of the two or more sections on each side of the trays are inserted into the slots in the side walls; and
    a U-shaped base having a first member with opposing ends, second and third members extending from the opposing ends and a support extending between the second and third members,
    wherein the one or more modules are attached to the U-shaped base to form the modular system.

2. The modular system for mounting batteries according to claim 1, wherein each of the sides of the top tray and the bottom tray of the one or more modules has two slits extending inwardly from the side edges to form three sections, and wherein one of the three sections is a middle section.

3. The modular system for mounting batteries according to claim 2, wherein one or more of the three sections has one or more apertures, and wherein the one or more apertures are aligned with at least one of the one or more apertures in the flanges on the sides of the side walls.

4. The modular system for mounting batteries according to claim 3, further comprising a plurality of fastening devices inserted in the aligned apertures to attach the top tray and the bottom tray to the first and second side walls.

5. The modular system for mounting batteries according to claim 3, wherein the one or more apertures in the one or more sections of the top tray or the bottom tray of one of the one or more modules is/are aligned with the one or more apertures in the one or more sections of the top tray or the bottom tray of an adjacent module.

6. The modular system for mounting batteries according to claim 5, further comprising a plurality of fastening devices inserted in the aligned apertures to attach the top tray and the bottom tray to the first and second side walls and to attach the one or more modules to the adjacent module.

7. The modular system for mounting batteries according to claim 5, further comprising a plurality of rivets or a plurality of bolts and nuts inserted in the one or more apertures to attach the top tray and the bottom tray to the first and second side walls and to attach the one or more modules to the adjacent module.

8. The modular system for mounting batteries according to claim 2, wherein a first surface of the middle section of each of the sides is offset from first surfaces of the other two sections.

9. The modular system for mounting batteries according to claim 1, further comprising one or more braces for connecting the one or more modules.

10. The modular system for mounting batteries according to claim 1, wherein the opposing ends of the wall of each top tray and bottom tray of each of the one or more modules has one or more apertures, and wherein at least one aperture in the opposing ends of each wall is aligned with at least one aperture in one of the end flanges of one of the first or second side walls.

11. The modular system for mounting batteries according to claim 10, wherein a fastening device is inserted through the at least one aligned apertures to secure the wall of the top or bottom tray to the first or second side wall.

12. The modular system for mounting batteries according to claim 1, wherein the top tray and the bottom tray of each of the one or more modules have one or more slots extending parallel to the ends of the trays, wherein the slots allow air to circulate through the module.

* * * * *